June 7, 1949. J. M. HENRY 2,472,158
RADIO BEACON SYSTEM
Filed July 26, 1940

INVENTOR
J. M. Henry
BY Jefferson Ehrlich
ATTORNEY

Patented June 7, 1949

2,472,158

UNITED STATES PATENT OFFICE 2,472,158

RADIO BEACON SYSTEM

James Matthew Henry, Needham, Mass., assignor to American Telephone and Telegraph Company, a corporation of New York Application July 26, 1940, Serial No. 347,660

9 Claims. (Cl. 343—112)

1

This invention relates to radio systems and especially to radio systems of the type that may be used as guides to navigation.

Present radio systems that are used as directional aids for aerial and other navigation comprise apparatus for the production of tone-modulated radio frequency waves which are transmitted from two crossed loop antennas having planes at right angles to each other. Such waves may be picked up in the receiver located in a mobile vehicle, such as an airplane, and the operator may then determine from the received waves whether he is on a specified course or on one side or the other of it. If he is on one side of the course his receiver will register dot-dash (. —) signals repeatedly, while if he is on the other side of the course the receiver will register the reverse signals—that is, dash-dot (— .) signals. While traveling along the course, however, the signals will be merged to form a steady tone. It will be apparent that when off the course the signals will remain unchanged and the operator will not know whether he is moving farther away from his assigned course or what the general direction of travel may be.

According to the present invention a radio system is set up which will radiate high frequency waves modulated in frequency, and these waves will be propagated in all directions in such a manner that the waves radiated in any one azimuth will have a characteristic distinguishing them from the waves radiated in all other azimuths. In other words, in accordance with this invention, radio waves will be transmitted equally in all directions and they may be picked up by a mobile vehicle at any place whatever and combined so that the combined wave will indicate accurately the true bearing or azimuth of the vehicle with respect to some predetermined point.

Briefly, the arrangement of this invention consists in the utilization of a plurality of electromagnetic wave radiators suitably excited from a common source of radio frequency waves the output of which is modulated in frequency at a fixed and predetermined rate. There will be a difference in the transit time of the waves from the various radiators to the receiving point (which may be a mobile vehicle such as an airplane) and this difference in transit time will be a function of, and will indicate, the true azimuth of the receiving point with respect to the transmitting point.

Figure 1:
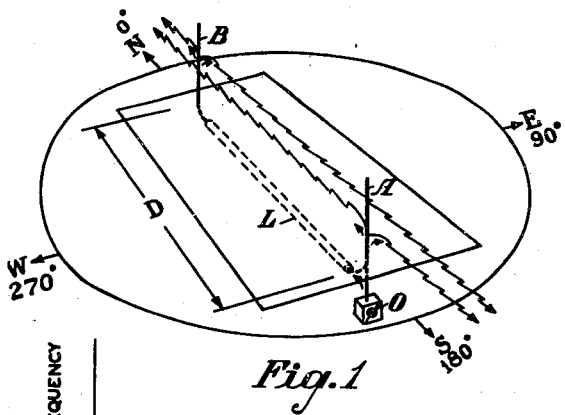
Figure 2:
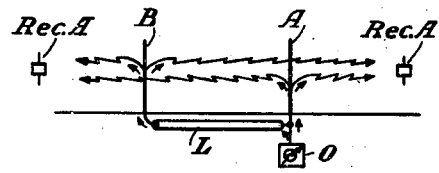
Figure 3:
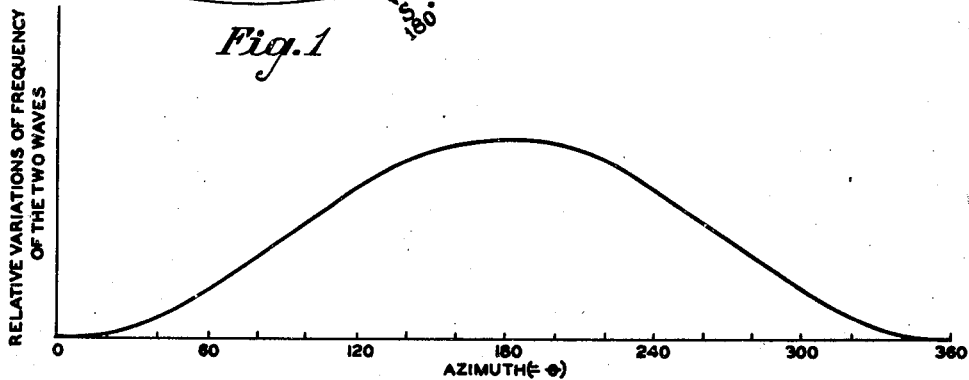
Figure 5:
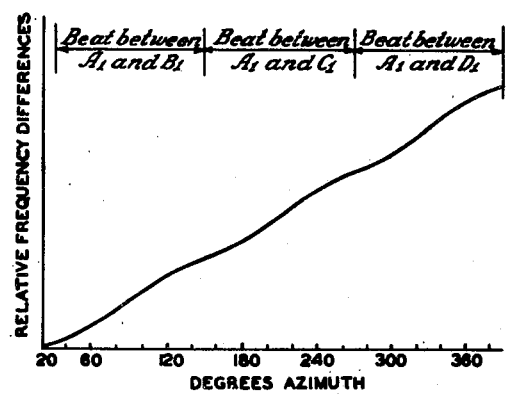
Figure 4:
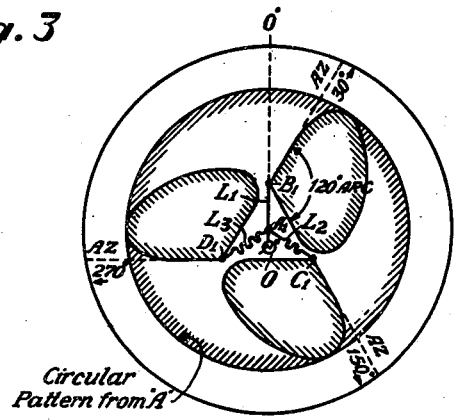
Figure 6A:
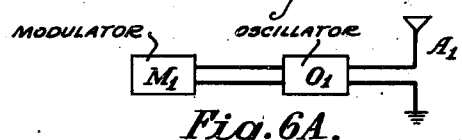
Figure 6B:
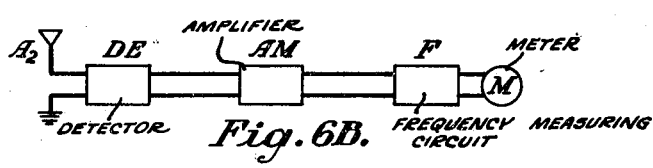

This invention will be better understood from the detailed description hereinafter following, when read in connection with the accompanying drawing, in which Figure 1 illustrates one embodiment of the invention employing two simple vertical radiators; Fig. 2 is another view of the arrangement shown in Fig. 1; Fig. 3 illustrates a curve used to explain certain of the characteristics of the invention; Fig. 4 shows a different embodiment of the invention utilizing a single vertical radiator and a plurality of radiators of a different type; Fig. 5 shows another curve to illustrate another feature of the invention; and Figs. 6A and 6B show the apparatus that may be used at the transmitting point and at the receiving point, respectively, in the arrangement of this invention.

Referring to Figs. 1 and 2 of the drawing, there is shown a schematical representation of one elementary form of the invention. Two suitable antennas or radiators, designated A and B, are separated from each other by a fixed and predetermined distance D which may be, for example, 500 feet, and these radiators are excited from a common source of very high frequency current designated O. This source O is arranged so that its frequency may be periodically varied continuously between fixed upper and lower limits at a relatively high rate by suitable mechanical or electronic or other means well known in the art. The energy of varying frequency of the source O is fed directly into the radiator A and then propagated through space in a well-known manner. The output of the source O is also fed into the distant radiator B via a transmission line L which may be, for example, a coaxial line or a wave guide system or the like, and the high frequency wave reaching the radiator B will likewise be propagated through space. The waves emitted by the two radiators will, of course, travel in all directions with substantially equal effects.

The electromagnetic waves propagated by the radiator A will move in the direction of B (as well as in all other directions) at about the speed of light. The electromagnetic waves transmitted from the source O over the line L to the radiator B will also travel at approximately the same speed. Assume now that an observer is located at some fixed point along the line A—B but beyond the point B, i. e., in a northerly direction (0° azimuth), and that the observer has a receiver which is suitable for receiving and beating together the waves emanating from both of the radiators A and B. The waves reaching the receiver will travel over two different paths, the path from the radiator A including the space between the radiators A and B and the space between the radiator B and the observer's receiver, while the other path will include not only the space between the radiator B and the receiver but also the electrical distance along the line L which is interposed between the two radiators. But since the two waves travel along the two different paths between the radiators A and B at approximately the same speed, the two waves will reach the receiver located beyond the point B in synchronism with each other and hence there will be no beat note between the two received waves. As the frequency of the source 0 varies from instant to instant, the two waves received at any instant at the receiver beyond B will continue to be in synchronism and there will be no beat note therebetween at any time. This same condition will be existent at all points along the line A—B but beyond the point B—that is, in the northerly direction. Hence, an observer receiving the two waves with a zero beat between them will know that he is in a northerly direction with respect to the line A—B or is traveling in that general direction.

Assume now that the observer changes his position so that his receiver is at some point along the line A—B but beyond A—that is, in a southerly direction (along the 180° azimuth). In this case the wave emanating from the radiator A will travel over the space between the radiator A and the receiver, while the other wave will travel over the line L to the radiator B and will then be returned over a distance which is equal to the sum of the spatial distance between the radiators B and A and the spatial distance between the radiator A and the receiver. In other words, the wave propagated by the radiator A will travel a shorter distance and will therefore reach the receiver prior to the time when the second wave reaches the receiver. Furthermore, because of the rapidly changing frequency of the source 0, the wave received at the receiver from one of the radiators such as A will at any instant be of a different frequency from the wave received from the other of the radiators such as B. Consequently the receiver will combine the two received waves of different frequencies and produce a beat note the frequency of which will correspond to the azimuth of the receiver with respect to the line of the propagating sources. However, the beat note obtained at a point to one side of line A—B will be the same as the note obtained on the other side of line A—B at a point where the angles between line A—B and the lines joining those points with the point equidistant from A and B are the same.

The difference between the frequencies of the waves received over the two transmission paths will correspond to the differenec in time required for the two waves to reach the receiver over paths of different lengths. When the receiving apparatus is at a point along line A—B but beyond A, this interval will be 2D/V, where D is the distance between the radiators and V is the velocity of propagation.

As already stated, the wave emitted from the source 0 is modulated in frequency—that is, it first increases in frequency and then decreases in frequency, and so on. At or near the instant of reversal of this cycle the heterodyne beat note obtained at the receiver will disappear momentarily, yet the beat frequency will otherwise remain the same both during the period of increase in the frequency of the source 0 as well as during the period of decrease.

At points other than those lying along the line A—B the frequency of the heterodyne beat note produced at the receiver will be intermediate of the two values already referred to—that is, between the zero beat note heard at zero azimuth and the higher tone heard at 180° azimuth. The beat note will assume a value which is equal to the amount by which the frequency of the source 0 has changed during an interval determined by the factor $$\frac{D(1-\cos\theta)}{V}$$

where $\theta$ is the azimuth of the point at which the receiver is located.

Fig. 3 shows the relationship between the differences in the frequencies of the waves received over the two paths at different azimuthal angles. It will be observed that the frequency difference between the two received waves is very small at small angles of azimuth and rises to a higher pitch which reaches a maximum at around 180°. The curve repeats itself between 180° and 360° as though it were a sine wave, returning to a zero beat note at 360°. A zero frequency difference or beat note will be obtained both at 0° and 360° azimuth.

It will be further observed from the curve of Fig. 3 that the slope is very small in the regions around 0°, 180°, and 360°. This means that the pitch of the beat note will vary only a few cycles per degree change of azimuth in those three regions. These small frequency changes may be increased to any desired extent by passing the current corresponding to the beat note through one or more frequency multipliers which will act to spread out the range of frequencies obtained. The use of such multipliers will give as great a change in the frequency of the beat note per degree change of azimuth as may be desired.

It will be further observed that the curve of Fig. 3 is symmetrical about the 180° axis. Consequently the beat note obtained at, for example 90°, will be approximately the same as that obtained at 270°; the beat note at 120° will be approximately the same as that at 240°, and so on. Thus, in the arrangement of Figs. 1 and 2 the same bearings will be obtained on one side of line A—B as at corresponding points on the other side of line A—B as already noted. This limitation, if undesired, may be overcome by an arrangement of the kind illustrated by the trifoliate system of Fig. 4.

In Fig. 4 the central vertical radiator is designated $A_1$ and, of course, its field strength pattern is circular. This radiator is excited directly by current obtained from the source 0 the frequency of which will be progressively modulated continuously as already discussed in regard to Figs. 1 and 2. The reference characters $B_1$, $C_1$ and $D_1$ designate radiators of a different type, each preferably propagating waves through a restricted arc as, for example, 120°. The radiators $B_1$, $C_1$ and $D_1$, for example, may be of the electromagnetic horn type well known in the art. The radiator $B_1$ may be set up so as to radiate electromagnetic waves uniformly between the limits of 30° and 150° azimuth, the radiator $C_1$ between 150° and 270°, and $D_1$ between 270° and 390° (360°+30°). However, none of the radiators $B_1$, $C_1$ and $D_1$ will propagate substantial amounts of energy outside of the two respective limits already referred to. The radiator $A_1$ is connected to the radiator $B_1$ by a transmission line $L_1$, which may be a coaxial line or a wave guide system or the like, as in Figs. 1 and 2. The radiators $A_1$ and $C_1$ are connected together by means of a line $L_2$ which may, for example, include a delay network (not shown) or the line $L_2$ may be folded back and forth a sufficient amount as shown for the purpose of introducing a predetermined amount of delay. A similar line $L_3$ is interposed between the radiators $A_1$ and $D_1$ and this line may include a larger delay network (not shown) or line $L_3$ may, if desired, be folded back and forth a greater amount. The functions of these delay networks will be explained hereinafter.

Within the arc 30° to 150° the receiver will pick up the two waves emanating from radiators $A_1$ and $B_1$ and these two waves, when beaten together, will produce a note the frequency of which changes with each cange in azimuth. If the receiver includes an indicating meter calibrated to degrees of azimuth, the azimuth of the receiver with respect to the radiator $A_1$ may be readily determined at the meter of the receiver. The pitch of the received beat note will become higher as the receiver is moved clockwise throughout the 30° to 150° arc.

As the receiver is moved into the range extending between 150° and 270°, the two waves then picked up by the receiver will emanate from the radiators $A_1$ and $C_1$. The delay interposed by the line $L_2$ will be such as to increase the frequency of the beat note so that it will be in a different band of the spectrum. Furthermore, the beat note will increase in frequency with each change of azimuth. Similarly, between the limits of 270° and 390° the waves emanating from radiators $A_1$ and $D_1$ will be received and their beat note—which is in a still higher band of the frequency spectrum due to the increased delay in line $L_3$—will also rise in frequency to correspond to each change of azimuth.

Thus the arrangement of Fig. 4 will register a beat note at any point of the compass and it will be of a pitch which will correspond to the position of the observer. In the region between 0 and 30°—where a change in the frequency of the beat note was very small with each different azimuth in the arrangement of Fig. 1—the frequency changes of the Fig. 4 scheme will be considerable. Equally large changes in frequency of the beat note will be obtainable in the region of 180°. If frequency changes of additional scope or separation are required, frequency multipliers may be added at the receiver as already suggested.

Another feature of this arrangement is that the delay interposed in a line such as $L_2$ will produce a beat note in the region of 150° azimuth which will vary smoothly as the receiver departs from the field of radiator $B_1$ and enters the field of radiator $C_1$. Equally smooth variations in pitch are obtainable—due to the delay in the line $L_3$—when the receiver is shifted from the range of radiator $C_1$ into the range of radiator $D_1$.

Fig. 5 illustrates the relative frequency differences of the two received waves plotted as ordinates as the receiver is moved over different regions of the compass which are plotted as abscissae. This curve shows that the beats between the waves received from radiators $A_1$ and $B_1$ rise uniformly in pitch with the clockwise rotation of the receiver; that the beat notes between the waves from radiators $A_1$ and $C_1$ are of the higher order and also increase progressively in pitch with further clockwise rotation of the receiver; and finally, that the pitch of the beat note of the waves emanating from radiators $A_1$ and $D_1$ is in a still higher range and that this note also progressively increases in frequency with each change of position of the receiver.

It will be understood that horn or other radiators propagating waves in small arcs such as 90°, 72°, 60°, etc. may be employed, but in such cases additional radiators will be required to complete the 360° coverage. However, all of the radiators will be positioned circumferentially about the central radiator $A_1$.

Fig. 6A shows the apparatus which may form the oscillator of variable frequency previously referred to. The oscillator here designated $O_1$ and the modulator $M_1$ may be coupled together either mechanically or otherwise in any well-known manner for the purpose of continuously varying the frequency of the oscillator from one value to another and back again in repeated cycles. The oscillator frequency may be of any value whatever, as for example, 500 megacycles. The antenna $A_1$ of Fig. 6A may be of the vertical type, as already pointed out.

The receiver located in the mobile vehicle is shown in Fig. 6B and this may comprise the usual type of antenna circuit $A_2$ suitable for the frequencies employed, a detector DE for beating the received waves together to obtain the required beat notes, an amplifier AM for amplifying the beat notes obtained, and a frequency measuring circuit F for properly impressing the amplified beat notes upon a meter M which may be calibrated as an ordinary compass.

It will be observed from Fig. 4 that the arrangement there shown introduces different losses between the antennae $A_1$ an $B_1$, $A_1$ and $C_1$, and $A_1$ and $D_1$, and this in turn may result in appreciably different levels of transmitted energy. These differences may be compensated, if desired, by suitably amplifying the energy so that it will be substantially the same at each of the radiators. Amplifiers of different gains may be employed for this purpose.

The apparatus of this invention will contribute to safety in flying and minimize the erroneous interpretations that may be made in navigating along radio beams of the type previously used. The arrangement will readily indicate to a pilot his azimuth with respect to a known point and the indication will be readable directly upon the dial of a meter.

The apparatus of this invention is especially valuable in marine navigation, especially near capes, entrances and channels. Rolling and pitching of the ship, or magnetic compass error will not affect the accuracy of the bearings obtained from the navigating meter of this invention. It will be understood that in marine navigation a 360° coverage may not be required, and that merely a 120° coverage, or even a smaller coverage, may be sufficient. Such coverage may be obtained from two simple vertical radiators of the kind already described.

While this invention has been shown and described in certain particular arrangements merely for the purpose of illustration, it will be understood that the general principles of this invention may be applied to other and widely varied organizations, without departing from the spirit of the invention and the scope of the appended claims.

What is claimed is:

1. A radio beacon system comprising a source of oscillations, means for modulating the frequency of said oscillations continuously between predetermined limits, a first antenna of a nondirectional type connected to said source of oscillations for radiating said oscillations, a second antenna of a directional type, a line connecting said source of oscillations with said second antenna, said line including a delay network interposing a delay of predetermined interval, said second antenna radiating said oscillations delayed in time with respect to the oscillations radiated by the first antenna so that both antennae will simultaneously radiate oscillations of different frequencies, the frequencies of the oscillations radiated by said antennae always differing by a predetermined amount.

2. An omni-directional radio beacon system comprising a vertical antenna, a source of oscillations continuously modulated in frequency between predetermined limits, said vertical antenna being connected to said source for radiating said oscillations, a plurality of equal antennae equidistant from said vertical antenna and disposed at equal angles with each other with respect to the vertical antenna, a plurality of lines of progressively increasing length separately interconnecting respectively the various antennae with the vertical antenna, each of the various antennae including means for radiating the oscillations through different non-overlapping arcs which together comprise 360 degrees.

3. An omni-directional radio beacon system comprising a central vertical antenna, a plurality of electromagnetic horn radiators which are equidistant from the central antenna and disposed at equal angles from each other with respect to the central antenna, the various horn radiators being capable of freely propagating electromagnetic waves over equal but different non-overlapping arcs which together comprise 360 degrees, a plurality of lines of different electrical lengths separately interconnecting the various horn radiators with the central antenna, and means for supplying to the central antenna and to the adjacent ends of the various lines oscillations continuously modulated in frequency between predetermined values.

4. An omni-directional radio beacon system comprising a central radiator capable of setting up an electromagnetic field of circular pattern, three radiators which are equidistant from the central radiator and separated by 120 degrees from each other, the distant radiators being capable of setting up electromagnetic fields within three arcs each of 120 degrees, said three arcs being non-overlapping, a source of oscillations modulated in frequency continuously between two predetermined limits, means for supplying said oscillations directly to the central radiator, and means for supplying said oscillations to the three distant radiators with delays of different intervals.

5. An omni-directional radio beacon system comprising a central vertical radiator, a plurality of directional radiators which are equi-distant from the central radiator and make equal angles with each other with respect to the central radiator, the fields set up by the directional radiators being mutually exclusive but together covering all points about the central vertical radiator, means for supplying to the central vertical radiator oscillations modulated in frequency continuously between two predetermined values, and means for supplying said oscillations to the various directional radiators delayed by different time intervals, said delays being of progressively increasing intervals as the oscillations are supplied to the various directional radiators in a preassigned direction about the central radiator.

6. A radio beacon system comprising two spaced antennae one of which is directional and the other non-directional, a line including a delay network interconnecting the two antennae, means for generating oscillations continuously modulated in frequency between predetermined limits, and means for supplying the frequency modulated oscillations simultaneously to one of said antennae and to the line connecting the latter antenna to the other antenna so that both antennae will simultaneously radiate oscillations of different frequencies, the frequencies of the oscillations radiated by said antennae always differing by a predetermined amount, whereby the azimuth relative to the location of both antennae of a receiver which picks up the radiations of both antennae may be determined.

7. A radio beacon system comprising means for generating oscillations the frequency of which is continuously varied between two predetermined limits, two antennae spaced from each other a predetermined distance, one of said antennae being directional and the other non-directional, and means for supplying said oscillations to said antennae so that both antennae will simultaneously radiate oscillations of different frequencies, the frequencies of the oscillations radiated by said antennae always differing by a predetermined amount, said latter means including a circuit having a delay network introducing a delay of a substantial predetermined interval of time interconnecting said antennae.

8. A radio beacon system comprising two antennae one of which is directional and the other non-directional, means for generating and supplying oscillations continuously modulated in frequency between two predetermined limits to said antennae, and means including a delay circuit interconnecting said antennae for delaying the radiation by one of said antennae by a fixed substantial interval of time with respect to the radiation by the other antenna so that both antennae will simultaneously radiate oscillations of different frequencies, the frequencies of the oscillations radiated by said antennae always differing by a predetermined amount.

9. In combination, a first antenna, a second antenna, a third antenna, a source of radio frequency waves varying in frequency between predetermined limits with substantially all of the rise in frequency being linear and substantially all of the decrease in frequency being linear, means for supplying waves from said source to said first antenna, a transmission system having appreciable delay for supplying waves from said source to said second antenna, the second antenna being spaced from the first antenna to thereby effect beats in space between the radiations from the first and second antennas the frequency of which beats differs depending on the position in space where received, a second transmission system having an appreciable delay different from the delay of the first-named transmission system for supplying waves from said source to said third antenna, the third antenna being spaced from said first and second antennas to thereby effect beats in space between the radiations from the first and third antennas the frequency of which beats differs depending on the position in space where received; and a remote receiving station whose position in space varies, said station including a radio receiver tuned to the frequency of said source and having a sufficiently broad band of response as to receive said beats, and indicating means connected to the output of said receiver to respond in a predetermined manner and thereby give a predetermined indication when the beats received from the first and second as well as the beats received from the first and third antennas have certain different frequencies respectively.

JAMES MATTHEW HENRY.

REFERENCES CITED

The following references are of record in the file of this patent:

UNITED STATES PATENTS

| Number | Name | Date |
|---|---|---|
| 1,732,741 | Conrad | Oct. 22, 1929 |
| 2,014,732 | Hansell | Sept. 17, 1935 |
| 2,138,894 | Ware | Dec. 6, 1938 |
| 2,183,562 | Hansell | Dec. 19, 1939 |
| 2,229,078 | Hansell | Jan. 21, 1941 |

FOREIGN PATENTS

| Number | Country | Date |
|---|---|---|
| 811,700 | France | Jan. 23, 1937 |

OTHER REFERENCES

Electronics for March, 1939—Cover pp. 14–17 and 82. Copy in Library.